United States Patent Office 3,450,455
Patented June 17, 1969

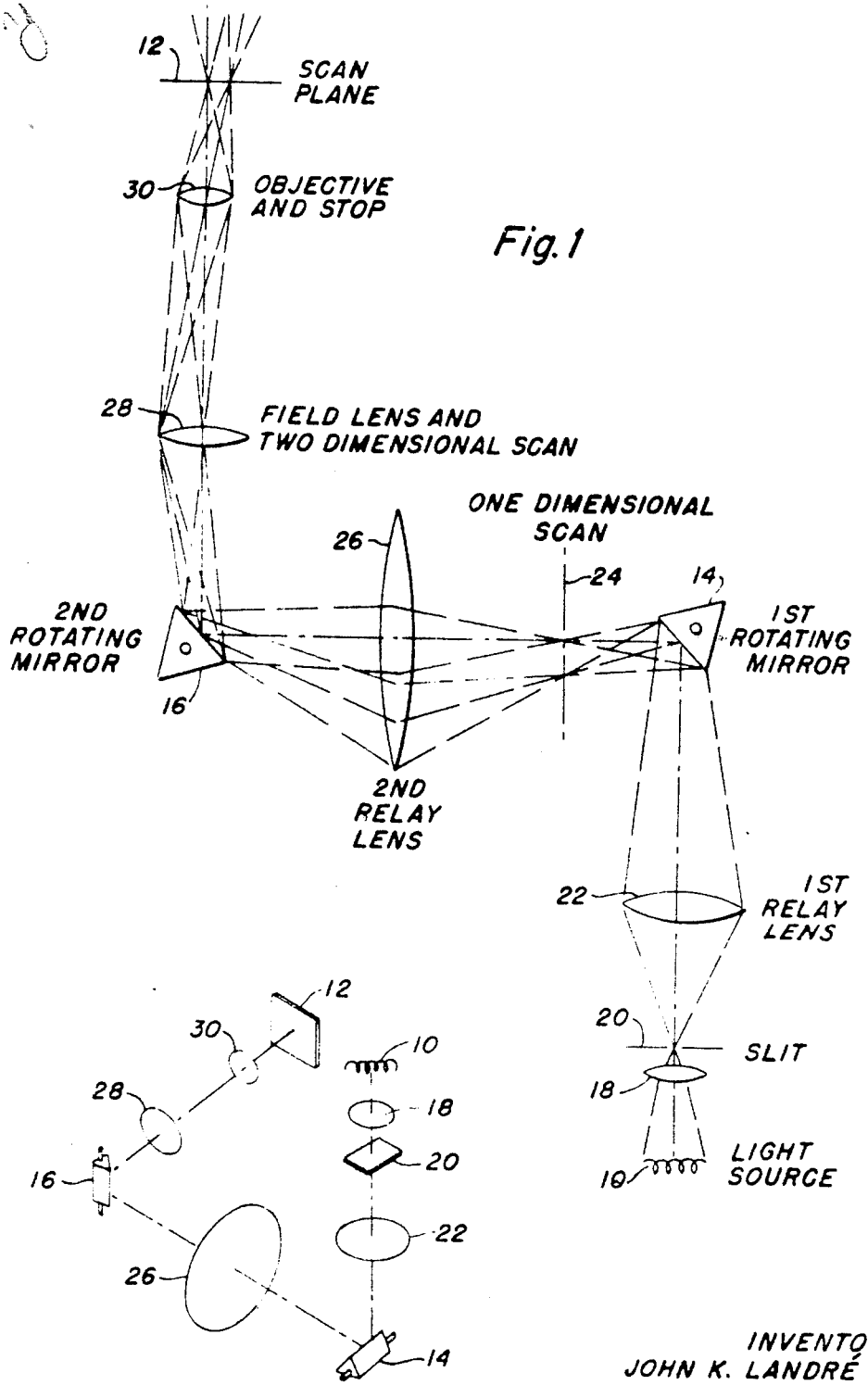

3,450,455
OPTICAL SCANNER
John K. Landre, Menlo Park, Calif., assignor, by mesne assignments, to Technical Operations, Incorporated, Burlington, Mass., a corporation of Delaware
Filed Mar. 3, 1966, Ser. No. 531,386
Int. Cl. G02b 17/08; H04n 3/08
U.S. Cl. 350—7                                                         3 Claims

ABSTRACT OF THE DISCLOSURE

A microdensitometer scanning means for producing a small spot wherein rotating mirrors are imaged on to an objective lens through optically aligned relay lenses.

This invention relates to scanners of the kind which are used, for example, in microdensitometry where a small spot of light is moved to produce scans of the line type for the purpose of producing a one-dimensioned analysis of density and spatial measurement of a record on a translucency such as a photographic film. Sometimes a second dimension is introduced and raster-type scans results. In this case, the optical system of the microdensitometer probes an entire film or specimen by making a series of closely spaced, parallel scans which are translated to coded parallel lines on paper providing an enlarged, readily readable record clearly showing quantitative density values. The value of the record so made depends, to a great extent, upon the smallness of the spot of light making the scan and the closeness of the lines in the raster. Due to Rayleigh limitations a high aperture objective lens is required to produce a very small spot of light. A scanning means, usually a mechanical motion of the film under study, is used with the objective lens. This invention pertains to systems using rotating mirrors to produce a scan.

Since the high aperture lens is necessarily close to the scan plane or the film being scanned, the use of a rotating mirror between it and the plane is not feasible. The beam of light entering a high aperture lens is large in diameter, and a mirror of large dimensions would be necessary if placed in front of the objective. A smaller mirror used in this position would be incapable of filling the objective lens with light. The application of a large mirror would result in the use of a different portion of the illuminating beam at all times.

It is the object of the present invention to overcome the above difficulties essentially by imaging the rotating mirrors onto the objective lens, and thus providing an optical scanner capable of scanning with a very small spot.

Another object of the invention is to produce a two dimensional or raster-type scan with a very small spot.

Further and more specific objects and advantages of the invention and the manner in which it is carried into practice are made apparent in the following specification wherein reference is made to the accompanying drawing:

FIG. 1 is a diagram of the optics of the present invention with the axis of one portion of the optics shown at an angle of 90° to its actual position in order to bring it into the plane of the paper; and FIG. 2 is a small schematic perspective view illustrating the axes of the various components of the system in their normal positions.

Light from a source represented as a filament 10 in FIG. 1 is focused to a spot which is swept in parallel lines across a film or specimen at a scan plane represented at 12. For convenience the parallel lines crossing this film will be referred to as the horizontal scan and that movement which causes the progressing of parallel lines from one edge to another of the film will be referred to as the vertical scan. In the present instance a first rotating mirror shown at 14 is employed to produce the vertical scan and a second rotating mirror 16 produces the horizontal scan. The position of the mirror 14 incorrectly shown in FIG. 1 is properly shown in FIG. 2 with its axis disposed perpendicular to that of the mirror 16. Consequently the scan produced by each mirror is in a different direction, and the mirror 14 rotating at a relatively slow speed, combined with the mirror 16, will cause each horizontal scan line produced by one surface of the mirror 16 to be spaced from that line just produced by an adjacent surface.

Light from the source 10 is focused through a lens 18 and a slit or stop 20 to the plane of a first relay lens 22, taking advantage of the Koehler system of illumination. This first relay lens transmits a converging beam to the surface of the first rotating mirror 14 which reflects it to produce a one-dimensional aerial spot scan, being the vertical scan, at a plane represented by the broken line 24. Two positions of the sweeping beam are illustrated here showing the manner in which it also sweeps across a second relay lens 26 which focuses the mirror 14 at, or substantially at, the plane of the second rotating mirror 16 and which simultaneously images the scan plane 24 at, or substantially at the plane of a field lens 28. The second mirror 16 is at right angles to the mirror 14 as shown in FIG. 2. Light from the mirror 14 will appear to illuminate the same part of a surface of the mirror 16 at all times. A two-dimensional scan is created at the plane of field lens 28.

The field lens 28 is disposed in the plane of the two-dimensional scan in such a manner that it images mirror 16 at, or substantially at the plane of an objective 30. The objective lens 30 is of high aperture which causes reproduction of hte two-dimensional scan with a very small light spot at the scan plane 12. The objective lens serves as a combination objective and stop.

The rotating mirrors are shown as triangular in shape to present three reflecting surfaces, however mirrors with any number of surfaces may be employed.

It is to be understood that in the art of microdensitometry means responsive to the light which passes the scan plane 12 are employed to produce a coded record. The nature of such means is, however, not pertinent to an understanding of this invention which is directed to the scanning means and the scanning means may have use in other arts.

I claim:

1. A high speed optical spot scanning system having an optical axis, comprising:
    lens means on said optical axis for collecting light from a dimensional moving source to form a beam and for converging said beam to a focus at a first scan plane;
    rotating beam reflecting means located in said beam on said axis for causing said beam focus to scan in said scan plane;
    field lens means on said axis at said scan plane; and
    objective lens means on said axis for imaging said scan plane at a second scan plane, said field lens means imaging said rotating beam reflecting means substantially at said objective lens means.

2. A high speed two-dimensional optical spot scanning system having an optical axis, comprising:
    first lens means on said optical axis for collecting light from a source to form a beam and for converging said beam to a focus in a first scan plane;
    rotating first beam reflecting means located in said beam on said axis for causing said beam focus to trace a one-dimensional scan in said scan plane;
    relay lens means on said axis for collecting light from said beam focus to form an angularly swinging beam and for converging said beam to a focus in a second scan plane;

rotating second beam reflecting means located in said beam on said axis for causing said beam focus in said second scan plane to trace a two-dimensional raster;

field lens means on said axis at said second scan plane; and objective lens means on said axis for imaging said second scan plane at an output scan plane, said field lens means imaging said second beam reflecting means substantially at said objective lens means.

3. A system as defined by claim 2 wherein said relay lens means images said first beam reflecting means substantially upon said second reflecting means.

References Cited

UNITED STATES PATENTS

| 2,497,042 | 2/1950 | Doll. | |
|---|---|---|---|
| 2,536,718 | 1/1951 | Brandon | 350—45 X |
| 2,719,457 | 10/1955 | Tripp | 350—45 X |
| 3,003,407 | 10/1961 | Grey | 350—45 X |
| 3,134,297 | 5/1964 | Carlson et al. | |

FOREIGN PATENTS 518,070 8/1953 Belgium.

DAVID SCHONBERG, *Primary Examiner.*

PAUL R. GILLIAM, *Assistant Examiner.*

U.S. Cl. X.R.

178—7.6; 350—45, 55; 356—203

PO-1050
(5/69)

UNITED STATES PATENT OFFICE
CERTIFICATE OF CORRECTION

Patent No. 3,450,455      Dated June 17, 1969

Inventor(s) John K. Landre

It is certified that error appears in the above-identified patent and that said Letters Patent are hereby corrected as shown below:

Column 2, claim 1, line 52, "dimensional" should read --one-dimensionally--;

Column 2, claim 2, line 69, "rotating first" should read --first rotating--; and Column 3, claim 2, line 4, "rotating second" should read --second rotating--.

SIGNED AND
SEALED
MAR 10 1970

(SEAL)
Attest:

Edward M. Fletcher, Jr.
Attesting Officer

WILLIAM E. SCHUYLER, JR.
Commissioner of Patents